United States Patent [19]
Kell

[11] 3,920,317
[45] Nov. 18, 1975

[54] BIASING RING FOR SPECTACLES

[76] Inventor: Hermann Eckardt Kell, P.O. Box 244, Sault Ste. Marie, Ontario, Canada

[22] Filed: Apr. 30, 1973

[21] Appl. No.: 355,525

[30] Foreign Application Priority Data
Nov. 23, 1972 Canada ............................. 157225

[52] U.S. Cl. ............................................... 351/113
[51] Int. Cl.² ........................................... G02C 5/16
[58] Field of Search ........................... 351/113, 123

[56] References Cited
UNITED STATES PATENTS

| | | |
|---|---|---|
| 2,761,353 | 9/1956 | Eustis .................................. 351/113 |
| 3,156,757 | 11/1964 | Spina .................................. 351/113 |
| 3,428,392 | 2/1969 | Chaney ................................ 351/113 |

FOREIGN PATENTS OR APPLICATIONS

| | | |
|---|---|---|
| 1,039,279 | 8/1966 | United Kingdom ................. 351/113 |
| 781,167 | 3/1968 | Canada .............................. 351/113 |

*Primary Examiner*—Paul A. Sacher
*Attorney, Agent, or Firm*—Michael S. Striker

[57] ABSTRACT

In eyeglasses the temple members become lax with spectacle use and result in the glasses sliding down on the nose or possibly slipping right off. In this apparatus or invention a pair of resilient elastomeric wedge shaped cylindrical members are adapted to surround the hinge members intermediate temple and frame members of a pair of spectacles whereby rotation of said cylindrical members co-operate with end portions of said temple and frame members to effect an adjustable biasing force on said temple member against the head of the wearer.

6 Claims, 5 Drawing Figures

BIASING RING FOR SPECTACLES

This apparatus relates to a manually operable device to effect a firm and secure eyeglass fit.

It is common with eyeglass use (this also applies to sunglasses, protective eyeglasses, or spectacles of any type or size) for the tension of the temple members to become lax, with resultant sliding down on the nose or slipping off entirely. To eliminate this, there is needed some device to readjust the temple members back into their original holding position and hold them there.

By the placement of a small, almost invisible, resilient elastomeric wedge shaped cylindrical member on each side over the temple members, adapted to surround the hinge member intermediate temple and frame members of a pair of glasses (done by sliding the same over the temple members, around the hinges, until the cylindrical member is in place), both of which said cylindrical members, on manual finger rotation, promote the desired tension for the temple members. These cylindrical members, cut from rubber, vinyl, or other equivalent resilient tubing material of preset size to eliminate manufacture waste, might be of coloured substance to match the fashion frame, or clear to give the invisible look. The cylindrical members when adapted into position remain intact at all times. In position they are manually finger rotated for the desired tension of the temple members of the glasses. Thus, the adapted cylindrical members perform their required function at all times.

The added advantages of this apparatus are:

1. The cylindrical members are cheaply and simply cut of preset size tubing material (of rubber, vinyl, or other equivalent resilient material) without waste.
2. There is no maintenance or upkeep, and should the cylindrical members become worn (an unusuality) they are easily and cheaply replaced.
3. There is no breakage in adaptation since the cylindrical members are of preset size (governed by the size of the eyeglass temple member) tubing material.
4. Once placed into position, the cylindrical member cannot fall off.
5. By reason of the manual finger rotation, and in equal use, the apparatus will outlast any existent device.
6. There is perfect eyeglass fit on finger (or manual) adjustment of pressure, size of apparatus or glasses having no bearing.
7. There is versatility in size and colour.
8. The apparatus eliminates the periodic need of going to the Optometrist to have the temple members of glasses rebent to original fit or tension, which, in turn, overcomes the danger of older glasses breaking during the rebending process.

In drawings which illustrate embodiments of the invention,

Figure 4:
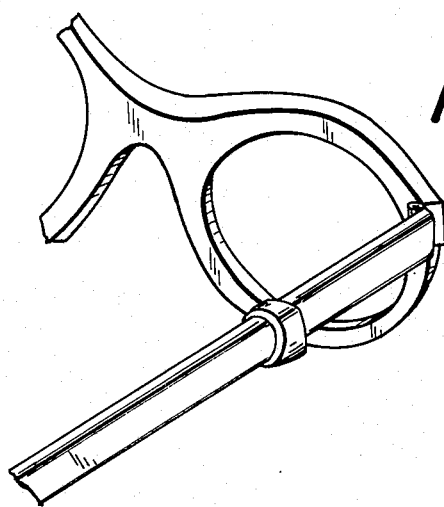

FIG. 4 is a perspective embodiment of the adaptation of the cylindrical member, i.e., of a part of the temple member with the cylindrical member sliding toward the hinge, behind which, and in front of the frame member, the cylindrical member upon finger rotation co-operates with end portions of said temple and frame members to effect an adjustable biasing force on said temple member against the head of the wearer.

Figure 5:
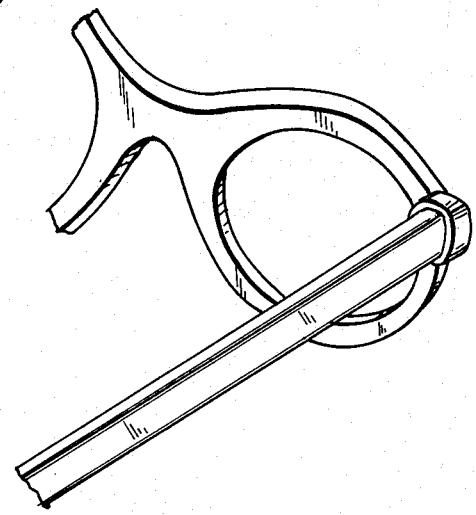

FIG. 5 is a perspective embodiment of the temple member with the cylindrical member in place.

Figure 1:
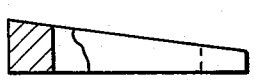
FIG. 1 is an elevation partly in section of one embodiment.
Figure 2:
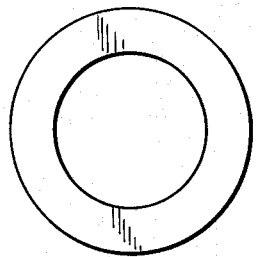
FIG. 2 is a top plan view of this embodiment.
Figure 3:
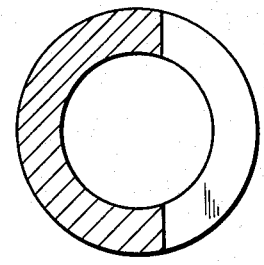
FIG. 3 is a section of the line I–II of FIG. 1.

FIG. 4 is a perspective embodiment of a part of the eyeglass temple member over which the resilient wedge shaped cylindrical member or apparatus (of FIGS. 1 and 2) has been slid, and it is shown sliding towards the hinge. It goes on to slide around the hinge where the said apparatus falls into place between the temple member and the frame of the glasses (FIGS. 3 and 5), from whence the apparatus acts. It is the sloping thickness (in FIG. 1) manually rotated by finger which creates the desired amount of biasing force on the temple member of the glasses; and thus, the adapted cylindrical members (or apparatus) perform their required function at all times.

The embodiment of the invention in which an exclusive property or privilege is claimed is defined as follows:

1. An annular elastomeric member having a wedge-shape and which tapers continuously from a first point on the circumference of said member to a diametrically opposite second point on said circumference, said member having a center opening and being adapted to surround a hinge connecting a temple member and a frame member of a pair of eyeglasses, the interposition of said member effecting the exertion of a biasing force between the temple member and the temple of a wearer, and manual rotation of said member effecting a continuous variation in the strength of said biasing force due to the wedge-shape of said member.

2. The annular member of claim 1, wherein the material of said member is rubber.

3. The annular member of claim 1, wherein the material of said member is vinyl.

4. The annular member of claim 3, wherein said vinyl is a clear vinyl.

5. The annular member of claim 3, wherein the said vinyl is a colored vinyl.

6. The annular member of claim 1, wherein the elastomeric member consists of tubing selected to suit the configuration of the temple member of a pair of eyeglasses.

* * * * *